W. SUDEKUM.
METALLIC PACKING.
APPLICATION FILED APR. 4, 1914.
1,118,314.
Patented Nov. 24, 1914.
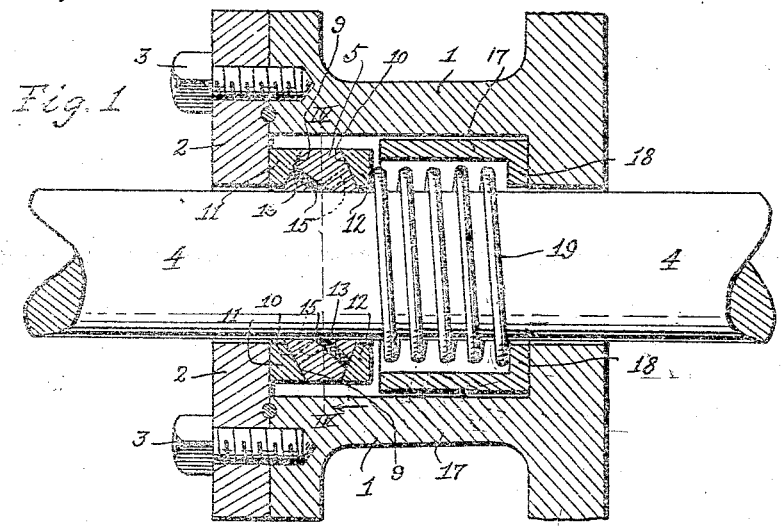
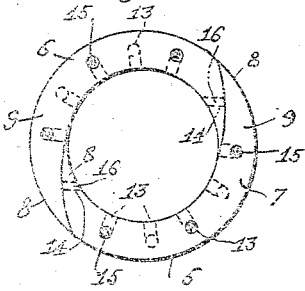
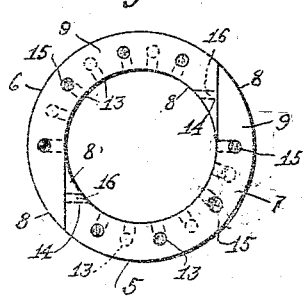
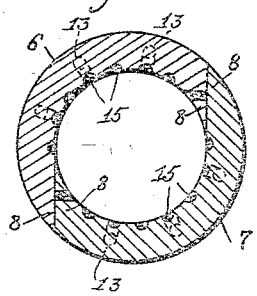
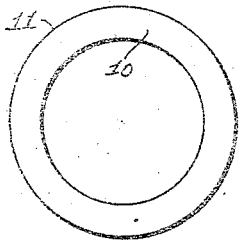
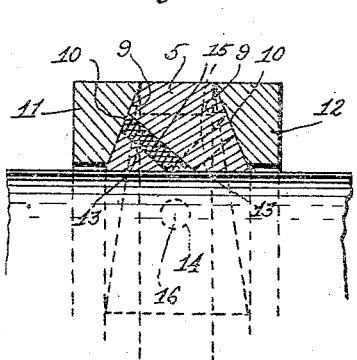
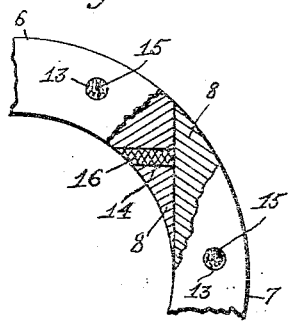
Witnesses
H. P. Roberts
Inventor
William Sudekum,
By W. Schönborn,
Attorney

UNITED STATES PATENT OFFICE.

WILLIAM SUDEKUM, OF NASHVILLE, TENNESSEE.

METALLIC PACKING.

1,118,314.  Specification of Letters Patent.  Patented Nov. 24, 1914.

Application filed April 4, 1914.  Serial No. 829,457.

*To all whom it may concern:*

Be it known that I, WILLIAM SUDEKUM, a citizen of the United States, residing at Nashville, in the county of Davidson and State of Tennessee, have invented certain new and useful Improvements in Metallic Packing, of which the following is a specification.

This invention pertains to a metallic packing, and more particularly to that class described in my former Patent No. 1,074,773, which are designed more especially for piston rods and valve stems of engines, pumps and the like, the purpose being to supply a packing which will insure the maintenance of a tight joint where extremely dry steam with high temperature is used under high pressure.

The object of this invention is to provide a two-piece, sectional packing having concealed lubricant sticks for lubricating the rod or stem and each contacting face of the packing sections; and further having beveled, overlapping ends permitting of its vibration with the rod or stem and thereby obviating any binding, thus eliminating the necessity of a ball ring and one ground joint, said beveled ends also producing closed joints which will take up any wear caused by the operation of the rod or stem.

While the invention may be adapted to different forms and conditions by changes in the structural and minor details, without departing from the spirit or essential features thereof, still the preferred embodiment is shown in the accompanying drawings which can be referred to, together with the following description, for a full understanding of the invention and the merits thereof, and also to acquire the knowledge of the details of construction and means for applying the invention.

My invention consists of structural features and relative arrangement of parts which will be hereinafter more fully described and particularly pointed out in the appended claims.

Similar reference characters indicate the same parts throughout the several figures of drawing, in which—

Figure 1 is a longitudinal section of a stuffing box provided with a packing embodying my invention; Fig. 2 is an end view of the packing ring, showing the ends of the sections curved; Fig. 3 is a similar view showing the ends of the sections straight; Fig. 4 is a longitudinal section taken on line IV—IV of the packing shown in Fig. 1; Fig. 5 is an end view of one of the beveled holding rings; Fig. 6 is a detail transverse section taken through the packing on an enlarged scale; and Fig. 7 is an enlarged and fragmentary view, partly in section, of one of the packing rings.

In the drawings, 1 denotes a stuffing box, the outer end of which is closed by a cap or cover 2, secured in position by any suitable fastening means, such as the screws 3.

The numeral 4 indicates a piston rod or stem passing through the stuffing box.

The packing ring is designated by the numeral 5 and consists of two counterpart arcual sections 6 and 7, terminating in beveled, overlapping ends 8, shown rounded in Fig. 2, and straight in Fig. 3. This packing ring 5 is of substantially frusto-conical cross-section, having oppositely beveled faces 9 engaged by the correspondingly beveled faces 10 of the rings 11 and 12.

The sections of the ring 5 are formed with ducts or holes 13 which lead from the beveled faces 10, in staggered relation, to a vertical line on the interior thereof, while additional ducts or holes 14 pass through the inner beveled ends of the sections 6 and 7. These ducts or holes 13 and 14 are filled with steatite, plumbago, or other lubricating sections, or sticks, shown by the numerals 15 and 16, respectively. The sections 15 obviously lubricate the rod or stem 4 and the contacting faces 9 and 10 of the rings 5, 11 and 12, while the sections 16 lubricate said rod or stem and the beveled faces 8 of the sections 6 and 7, of the ring 5.

A shell 17 is disposed within the stuffing box 1 and is formed with an inwardly directed annular flange 18 which bears against the end of the stuffing box. A spring 19 is seated within this shell 17 and bears at its opposite end against the adjacent face of the ring 12, forcing the opposed face of the ring 11 against the inner side of the cap 2, thereby sealing the stuffing box.

From the foregoing it will be apparent that as the inner surfaces of the ring sections 6 and 7 wear, the pressure of the spring 19 through the medium of the beveled faces 9 and 10, will force the packing ring against the rod or stem 4, which movement is made possible without interfering with the overlapped ends 8, owing to the fact that said ends are beveled tangential to the inner periphery of said packing ring 5. Should there be any vibration of the rod 4, the packing ring 5 together with the rings 11 and 12 can readily take up the movement of the rod without disturbing their close fit against the rod 4, and by constructing the shell 17 in relation with the coil spring 19, as shown, said spring can move with the shell without disturbing its relation with the stuffing box. Also, by providing the steatite, plumbago, or other lubricating sections or sticks in the packing ring, as disclosed, the same will be protected from the steam and will serve to lubricate not only the rod 4, but each contacting surface of said packing.

From the foregoing it will be readily seen that a packing is provided for stuffing boxes and the like, which will fulfil all the necessary requirements of such a device.

What I claim is:—

1. A metallic packing comprising a stuffing box adapted to slidingly receive a piston rod, a metallic sectional packing ring surrounding said piston rod, the ends of said packing ring being overlapped and the sides of said packing ring being conical, a side ring on each side of the packing ring having its inner face conforming to a conical face of the sectional packing ring, lubricating sticks or rods within said sectional packing ring arranged so that one end of each of said rods or sticks is in contact with an inner conical face of a side ring while the other end of each of said sticks or rods is in contact with the piston rod, a shell within the stuffing box and having a flange at its inner end loosely surrounding the piston rod, a coil spring surrounding the piston rod, one end of said spring bearing against the flange of the shell and the other end thereof bearing against the inner surrounding ring.

2. A metallic packing comprising a stuffing box adapted to slidingly receive a piston rod, a metallic sectional packing ring surrounding said piston rod, the ends of said packing ring being beveled tangential to the inner periphery of said ring, and overlapped, and the sides of said ring being conical, a side ring surrounding the piston rod on each side of the packing ring and having its inner face conforming to a conical face of the sectional packing ring, staggered inclined lubricating sticks or rods passing through the sections of the packing ring, and arranged so that one end of each of said sticks or rods is in contact with an inner conical face of a side ring while the other end of each of said sticks or rods is in contact with the piston rod, a shell within the stuffing box and having a flange at its inner end loosely surrounding the piston rod, a coil spring surrounding the piston rod, one end of the spring bearing against the flange of the shell and the other end thereof bearing against the inner surrounding ring.

3. A metallic packing comprising a stuffing box adapted to slidingly receive a piston rod, a sectional metallic packing ring surrounding said piston rod, said packing ring comprising a plurality of counterpart sections having their ends overlapping and beveled tangential to the inner periphery of said packing ring, the sides of the packing ring being conical, a side ring surrounding the piston rod upon either side of the sectional packing ring and conforming to a side conical face of the packing ring, said sections of the packing ring having ducts or holes formed therein, said ducts or holes extending from the inner surface of the packing ring adjacent to the piston rod through the beveled conical sides thereof, and through the inner beveled ends thereof, lubricating material disposed within said ducts or holes, a shell within the stuffing box and having a flange at its inner end loosely surrounding the piston rod, a coil spring surrounding the piston rod, one end of said coil spring bearing against the flange of the shell and the other end thereof bearing against the inner surrounding ring.

In testimony whereof I affix my signature in presence of two witnesses.

WILLIAM SUDEKUM.

Witnesses:
CHAS. H. SIMPSON,
WM. SUDEKUM.